United States Patent [19]

Ohtsu

[11] Patent Number: 4,921,718
[45] Date of Patent: May 1, 1990

[54] METHOD FOR PRODUCING QUICK COOKING PROCESSED RICE

[75] Inventor: Susumu Ohtsu, Fujisawa, Japan

[73] Assignee: Ishimoto Food Industry Kabushikikaisha, Tokyo, Japan

[21] Appl. No.: 276,795

[22] Filed: Nov. 28, 1988

[30] Foreign Application Priority Data

Dec. 3, 1987 [JP] Japan ................. 62-304483

[51] Int. Cl.⁵ .............................. A23L 1/182
[52] U.S. Cl. ................................ 426/618; 426/410
[58] Field of Search ............ 426/618, 268, 270, 395, 426/410

[56] References Cited

FOREIGN PATENT DOCUMENTS 48-02781 1/1973 Japan ................................ 426/618

OTHER PUBLICATIONS

Japanese patent publication No. 0054-650-A.
Japanese patent publication No. 0047938.

*Primary Examiner*—Donald E. Czaja
*Assistant Examiner*—Mary S. Mims
*Attorney, Agent, or Firm*—Gifford, Groh, Sprinkle, Patmore and Anderson

[57] ABSTRACT

A method for producing quick cooking processed rice in which brown rice is pounded and refined into cleaned rice. The cleaned rice is washed in water, removed from the water and the remaining water is removed. The cleaned rice is soaked in an ethanol aqueous solution for absorbing the solution. The solution absorbed rice is removed from the remaining solution and is packaged in a sealed container.

15 Claims, No Drawings

METHOD FOR PRODUCING QUICK COOKING PROCESSED RICE

The present invention relates to a method for producing quick cooking processed rice which provides much shorter cooking time than the common cleaned rice (so called white rice), and a method for producing quick cooking processed rice which contains ethanol aqueous solution in it and which absorbs boiled water due to osmotic pressure while being cooked giving a resultant cooked rice with good taste and excellent chewing texture.

Considerable research has been conducted to make good quality cooked rice (flavor, stickiness, elasticity, hue) from cleaned rice. It is well known to improve rice species, cooking devices and various cooking techniques such as by a preliminary soaking of rice in water, to add proper volume of water, to control cooking time, and to adjust steaming time. No prior art however, has been presented for production of harvested processed rice itself which will provide quick cooking, quality rice where a conventional rice cooker is used with new or old rice.

It is necessary to distinguish the relationship between the characteristics of rice and the function of cooking in order to find a way to cook rice quickly while achieving high quality rice.

Rice cooking provides for turning starch particles consisting of amylose and amylopectin contained in rice to alpha starch. Rice starch, which composes 75% of the refined rice contents, has linkages of glucose consisting of polysaccharide amylose of more than hundred thousands of molecules and polysaccharide amylopectin with similar linkages and branched glucose of more than tens of millions of molecules. Non-glutinous rice contains on an average 83 parts of amylopectin to 17 parts of amylose.

The albumen (called white rice, the main grain body remaining after refining of the rice) has the above mentioned molecules forming a single starch particle, 5 to 15 of which flock together. As rice plants ripen, the starch particles become filled with amyloplasts which are starch cells. A grain of rice is made up from 10 thousands to 15 thousands of the amyloplasts.

Amylose and amylopectin in raw rice starch have their glucose linkages bundled (micellizied) so tight that even water molecules do not permeate in them. If starch and water are heated together, their molecules are activated to increase their movement. If energy movement is increased and exceeds the energy of the micell structure, the micell structure collapses to become random in its arrangement, through which water penetration occurs resulting in swelled starch. Swelled and wet starch is easier for digestion and is called alpha starch, which reacts easily to digestive enzymes because of the collapsed micell structure. On the other hand, free movement of the linked molecules of amylose and amylopectin is restricted in the swelled, wet starch which results in stickiness of the cooked rice. Especially, intricately linkage branches of long amylopectin molecules are the essential factor which gives stickiness to cooked rice, so that the important chewing texture of the cooked rice is created.

Understanding of the features and denaturization of rice as mentioned above provides important information to determine the heat required which is necessary to turn rice starch smoothly to alpha starch when cooking.

The starch of the cleaned rice is changed easily to the alpha starch when it is heated with water at 65° to 70° C., but long cooking time and high temperature heating is necessary to affect the center of the rice grain because the structure of its amyloplast is so dense and hard that water can hardly penetrate it. Quality cooked rice is characterized by its reasonable stickiness and elasticity. A long cooking time causes, dissolution of starch from the rice grain causing lowered elasticity of the resultant cooked rice. It is, therefore, important that the time lag between heating the center of the rice grain and the time heating the surroundings to become alpha starch should be minimized so that starch dissolution from the center of the rice grain is prevented.

The List of Experimental Results below shows the relationship between the time required to turn the cleaned rice starch to the alpha starch and the temperature of water used.

In the experiment, 20 gs of rice were respectively put in 500 cc of hot water which was maintained at each set temperature. Then the respective time required to change the rice starch to the alpha starch at different temperatures and visual, touch sense and chewing texture observations were recorded.

| LIST OF EXPERIMENTAL RESULTS | | |
|---|---|---|
| Set Water Temperature | Alpha Starch Production Time | Shape of Cooked Rice |
| 70° C. | 200-250 Minutes | The original shape of the rice grain is completely given away, and becomes almost like paste. |
| 80° C. | 80-100 Minutes | The rice grain is collapsed and starch is dissolved in water. |
| 90° C. | 60-80 Minutes | The surface of the rice grain is collapsed and a small amount of starch is dissolved in water. |
| 95° C. | 30-40 Minutes | The rice grain remains in its original shape, but is too wet and lacks elasticity. |
| 98° C. | 20-25 Minutes | The rice remains in its original shape and its elasticity and stickiness are favorable. |

The experiment has revealed that rice is cooked favorably to produce alpha starch when a high temperature is applied for a short period of time rather than cooked at a low temperature for a long time. The undesirable pasty result of cooked rice is caused by dissolution of starch in water and occurs more with a long cooking time than with a high cooking water temperature.

Because of the above mentioned reasons, the cooked rice with reasonable stickiness and elasticity is attributed to the shortest possible time to turn the rice starch to the complete alpha starch. The rice cooking time is made short to obtain complete alpha starch without the help of an improved rice cooking device if the rice itself is improved and possesses water absorbing capability.

It is accordingly an object of the present invention to accomplish improvement of rice by providing a process to have it absorb ethanol aqueous solution which facilitates its absorption of water assisted by osmotic pressure developed while it is cooked. Thus, the rice starch completely becomes the alpha starch very quickly with the resultant quality cooked rice.

A process of producing the quick cooking processed rice of this invention and its function are mentioned in the following:

Brown rice is pounded and refined to make cleaned rice, and then its is washed. The pounding of refined whitness is required to around 39% to 41%, preferably 40%. Washing of the rice in this preliminary stage aims at saving the pre-cooking washing, but it should be finished in as quick as 2 to 3 minutes using a known stir type washing apparatus so that only a little water is absorbed. The washed, cleaned rice is removed from the wash water and the surface of the cleaned rice grain is removed and then soaked in 4 mol to 13 mol ethanol aqueous solution (184–598 gs ethanol dissolved in 1 liter of water), preferably 10 mol ehtanol aqueous solution (460 gs ethanol in 1 liter of water), in which the rice aborsbs ethanol. The washed rice dipped in the aqueous solution first dissipates water, thinning the density of the solution. It is, therefore, necessary to add ethanol to the solution measuring with a hydrometer in order to maintain a required solution density. Ethanol absorbed in the rice ranges from 25% to 10% weight ratio of the cleaned rice in 4 mol to 13 mol ethanol aqueous solution and about 10% in 10 mol ethanol aqueous solution.

The thicker the ethanol aqueous solution, the longer it takes for said cleaned rice to absorb the solution. For example, it takes more than 10 hours to have the rice absorb the solution by 15% of the rice weight in 10% ethanol aqueous solution at room temperature and atmospheric pressure. If the cleaned rice is soaked in the ethanol aqueous solution in an air-tight vessel and if the pressure in the vessel is reduced and increased alternatively by an air compressor, the absorption is attained in 1/10 of the time, although absorption time varies depending on pressure differential. The rice with absorbed ethanol aqueous solution is taken out of the solution and the remaining solution is removed from the surface of the rice grains. A centrifugal separator drains it quickly, but a container with a net at the bottom is also satisfactory although removing it takes time. The ethanol aqueous solution contains dissolved residuals of unseparated fat or other rice bran. These are carried in with the cleaned rice and the residuals remain on the surface of the processed rice causing it to ruin both quality and taste of the cooked rice if the remaining solution is not removed from the surface of the rice grain.

A desired volume of the solution absorbed rice is then packaged in a sealed synthetic resin bag. The packed, processed rice is well preserved because of the absorbed ethanol. Sealing nitrogen gas into the bag is desirable as it prevents multiplication of some bacteria which may not be destroyed by the ethanol and the nitrogen gas also inhibits oxidation.

The function and advantages provided by the processed rice of the present invention after it has been cooked are described in the following:

The processed rice is cooked in a conventional cooker as an iron pot, electric or gas cooker. To cook the processed rice, equal amounts of rice and water are added to the cooker and heated.

When heat is applied in cooking, water active AW of the ethanol aqueous solution contained in the processed rice is expressed in the following formula:

$$AW = \frac{\text{Mol Density of Water}}{\text{Mol Density of Water} + \text{Mol Density of Solute}}$$

where the mol density of water is 55.51. In case of 10 mol ethanol solution, AW is calculated as follows:

$$AW = \frac{55.51}{55.51 + 10} = 0.847$$

This water activation causes development of osmotic pressure between the processed rice and cooking water. The osmotic pressure at AW=0.85 and a temperature of 20° C. is about 250 atmospheric pressure. Such a high osmotic pressure enables boiled water to penetrate into the rice so that starch in the quick cooking processed rice is turned shortly to alpha starch resulting in perfectly cooked rice.

The water active value AW ranges from 0.91 to 0.81 when the quick cooking processed rice contains 4 mol to 13 mol ethanol solution. The minimum water active value which allows vegetation of the microorganisms in free water is 0.91 for bacterium, 0.88 for yeast, and 0.8 for mold fungus. The processed rice is, therefor, well preserved so that the processed rice produced through the method of this invention can be stored for a long period of time without deterioration of the quality. In addition, a long storage time does not effect the original taste of the processed rice no matter when it may be cooked.

The boiling point of ethanol is 78.3° C. No ethanol is left in the cooked rice because of vaporization during the cooking. The cooked rice does not carry the nasty odor of ethanol and the original flavor of the rice remains.

The following examples further describe preferred advantages within the scope of the present invention.

EXAMPLE I

Old rice of "KITAHIKARI" harvested in Japan was pounded and refined up to 40% whiteness and was mixer-washed for 3 minutes. It was then soaked in 10 mol ethanol aqueous solution for 30 minutes, and the solution density was compensated and the inside pressure was reduced and increased alternatively during the process. Thus, processed rice containing 15% ethanol aqueous solution of the weight ratio was obtained. The ethanol absorbed rice was then moved immediately to a net container where it was left for 2 hours. Later, 200 gs (300 cc) of the ethanol absorbed rice was scooped out to be moved into a RINNAI automatic gas cooker (1 kg capacity), in which 300 cc of water was added to complete preparation for cooking.

Boiling inside the cooker started 3 minutes after the cooker had been turned on. The switch was automatically turned off in 6 minutes 20 seconds after boiling started and then steaming (caring) was allowed to take place with the warming switch kept on. After 5 minutes of steaming, the warming switch was manually turned off to complete cooking. The processed rice weighed 420 gs when it was cooked. Five monitor panelists observed the cooked rice and found that all the grains of rice were what is called "standing", that is, all of the grains arranged lengthwise. The hue of the rice was pure white as had not before been observed in ordinarily cooked rice. The panelists tried it and agreed that the sample was among the best of those they had ever tried in its stickiness, elasticity, flavor and taste.

EXAMPLE II

In this test, 100 gs (180 cc) of the processed rice obtained in Example I were put into a china bowl, into which 180 cc of water was poured. The china bowl without a top cover was then placed in a 500 W electric oven to complete preparation for cooking.

The oven was turned off 7 minutes after it had been turned on although it was not known when boiling started. The top cover was placed on the china bowl and left in the oven for 7 minutes for steaming (caring) before it was taken out of the oven. The cooked rice weighed 215 gs. The five monitor panelists tried it and agreed that the result was the same as that of EXAMPLE I except for the fact that the center of the rice grain where the microwave was supposedly concentrated was a little too dried.

In addition to the above described advantage that the processed rice of the present invention provides better cooked quality and shorter cooking time than the existing refined rice, it also provides the following advantages:

For cooking, the quick cooking processed rice of the present invention does not require preliminary preparations such as washing and soaking which are ordinarily necessary before cooking of the existing cleaned rice. This feature helps same time and labor.

Another advantage of the quick cooking processed rice is that it enables the use of the conventional heavy duty rice cooker in spite of the small cooking quantity. It is most suitable to the modern society where nuclear families and individualized taste in food is on the increase.

Another advantage of the quick cooking rice is that its cooking time is ½ as long as that of the conventional cleaned rice and that meets with the rushing customers requirement in business, while labor and fuel are saved.

A further advantage of the quick cooking processed rice is that the cooked rice comes out better than the existing refined rice in flavor, elasticity, stickiness and hue in spite of the quality of cleaned rice whether new or old.

Another advantage of the quick cooking processed rice is that the starch of the rice is turned into complete alpha starch even when cooked at a high altitude where atmospheric pressure is lower.

A further advantage of said quick cooking processed rice is that not only an automatic rice cooker but also an electric range can be utilized to cook it, and that a specialized cooker enables it to cook in a shorter time so that it is cooked conveniently with good quality while customers wait for the "KAMA MESHI" dish (rice with ingredients in a small pot, KAMA being cooked at the customer's table for immediate serving) such as KINOKO MESHI (rice with mushroom) in restaurants.

What is claimed is:

1. A method for producing quick-cooking, processed rice, comprising the steps of:
   pounding brown rice until a cleaned rice is obtained having a whiteness of at least 39 to 41 per cent;
   washing said cleaned rice in water for a period of about 2 to 3 minutes, said period being too short to swell said cleaned rice;
   removing all water from the surface of said cleaned rice;
   soaking said cleaned rice in an about 4 mol to 13 mol aqueous solution of ethanol for a time adequate to permit absorption of a portion of said solution throughout said cleaned rice and thereby yield ethanol-absorbed rice;
   removing all ethanol solution from the surface of said ethanol-absorbed rice while retaining in said ethanol-absorbed rice said portion of said ethanol solution absorbed; and
   packaging said ethanol-absorbed rice in a container sealed adequately to retain said portion of said ethanol solution absorbed in said ethanol-absorbed rice.
2. The method according to claim 1, wherein said packaging step is carried out employing an airtight container comprising a bag made from a sheet material laminated with a synthetic resin film.
3. The method according to claim 1, wherein said packaging step includes placing an inactive gas in said container with said ethanol-absorbed rice.
4. The method according to claim 1, wherein said soaking step is carried out from about 10 minutes to 1 hour.
5. The method according to claim 1, wherein said soaking step is carried out by placing said cleaned rice and said solution in a solution vessel and adjusting the pressure in said solution vessel so as to maintain a weight ratio of said ethanol aqueous solution to said cleaned rice of about 25 to 10 per cent.
6. The method according to claim 5, wherein said pressure adjusting step is carried out by alternately increasing and reducing the pressure inside said solution vessel.
7. The method according to claim 6, wherein said pressure adjusting step is carried out using an air compressor connected to said solution vessel.
8. The method according to claim 1, wherein said washing step is carried out using a stirring washing apparatus.
9. The method according to claim 3, wherein said inactive gas is nitrogen.
10. The method according to claim 1, wherein said soaking step comprises controlling the density of said ethanol aqueous solution to maintain a predetermined desired solution density and to compensate for any change in solution density arising from water carried over into said solution by said cleaned rice from said washing step.
11. The method according to claim 1, wherein said washing step is carried out by immersion of said cleaned rice in said water, and said water-removing step is carried out by removing said cleaned rice from said water.
12. The method according to claim 1, wherein said soaking step is carried out by immersion of said cleaned rice in said ethanol solution, and said solution-removing step is carried out by removing said ethanol-absorbed rice from said solution.
13. The method according to claim 12, wherein said ethanol-absorbed rice is removed from said solution by netting.
14. The method according to claim 1, wherein said solution-removing step is carried out by centrifugal separation of said ethanol-absorbed rice and said solution.
15. The packaged rice and sealed container product produced by the method of claim 1.

* * * * *